United States Patent Office 3,346,636
Patented Oct. 10, 1967

3,346,636
PRODUCTION OF CYCLOHEXYLAMINE
Robert S. Barker, Port Washington, N.Y., assignor to Halcon International, Inc., a corporation of Delaware
No Drawing. Filed Feb. 13, 1964, Ser. No. 344,531
3 Claims. (Cl. 260—563)

This is a continuation-in-part of application Ser. No. 258,648, filed Feb. 14, 1963, now abandoned.

This invention relates to processes for preparing cyclohexylamine from cyclohexane by oxidizing the latter to produce a crude cyclehexanol material and reacting the latter with ammonia in the presence of hydrogen and a hydrogenation catalyst to produce cyclohexylamine, more particularly to such a process wherein the oxidation is carried out in the presence of meta-boric acid whereby the crude cyclohexanol contains up to about 15% of cyclohexanone, and especially to such processes wherein the hydrogenation cataylst is nickel or cobalt on alumina or kieselguhr and the amination is carried out at about 200° C. and 200 p.s.i.g. Additionally, the cyclohexylamine is reacted with hydrogen peroxide to form the corresponding oxime which in turn is reacted with concentrated sulfuric acid to form epsilon-caprolactam. Any oxygenated cyclohexane material in the amination reaction mixture or in the amine oxidation reaction mixture is recycled to the amine formation step.

Various processes have been suggested heretofore for producing cyclohexylamine and also for converting the latter via a series of steps to epsilon-caprolactam, a commercially important material. Some of the are undesirable because they consume costly hydroxylamine. Some processes for forming cyclohexanol are undesirable because they require a plurality of reaction steps, e.g. including a "deperoxidation" step. Others are undesirable because they require intermediate separation steps, e.g. refining the cyclohexanol. The art is confronted by the problem of providing more efficient or economical processes for producing the cyclohexylamine as well as for producing epsilon-caprolactam.

The discoveries associated with the invention and relating to the solution of the above problems, and the objects achieved in accordance with the invention as set forth herein include the provision of:

A process for the preparation of a cyclohexylamine from a cyclohexane which comprises reacting liquid cyclohexane with oxygen in the presence of a lower hydrate of boric acid at an elevated temperature in the range 75° to 300° C. and a pressure in the range of 100 to 1000 p.s.i.g. and converting it to the corresponding crude cyclohexanol mixture containing up to about 15% of the corresponding cyclohexanone, separating the latter mixture and reacting it with ammonia in the presence of hydrogen and a hydrogenation catalyst at elevated temperature in the range of 130° to 500° C. and pressure in the range of 5 to 250 atmospheres to form cyclohexylamine, and recovering the latter, the ratio of ammonia being in the range of 2 to 10 mols per mol of the crude cyclohexanol and the ratio of hydrogen being in the range of 2 to 10 mols per mol of said cyclohexanol;

Such a process wherein about 7 to 12% of the cyclohexane is converted to crude cyclohexanol, the remainder being recycled, the cyclohexylamine is recovered by distillation of the ammonia reaction product and the resulting residue (which may include cyclohexanone derived Schiff base) is recycled to the ammonia reaction step;

Such a process wherein the hydrogenation catalyst is nickel-on-alumina and the ammonia reaction step is carried out at 200° C. and 200 p.s.i.g.;

Such a process wherein the cyclohexylamine is reacted with hydrogen peroxide in the presence of a tungstate catalyst to produce a cyclohexanone-oxime material, separating the latter and subjecting it to rearrangement in the presence of concentrated sulfuric acid, whereby epsilon-caprolactam is formed, and recovering the latter, by-product organic residue formed in the peroxide reaction step being recycled to the ammonia reaction step;

Such a process wherein the temperature is in the range of 0° to 20° C.;

Such a process wherein the peroxide reaction is carried out in the presence of 2,6-dipicolinic acid at a reaction temperature in the range of 25° to about 75° C. or somewhat above; and Other objects which will be apparent as details or embodiments of the invention are set forth hereinafter.

In order to indicate still more fully the nature of the present invention, the following examples of typical procedures are set forth in which parts and percents means parts and percents by weights, respectively, unless otherwise indicated, it being understood that these examples are presented as illustrative only and they are not intended to limit the scope of the invention.

Example 1

A batch oxidation reactor is charged with 135 parts of meta-boric acid and 2711 parts of cyclohexane, and is maintained at a temperature of about 330° F. and a pressure of 120 p.s.i.g. Air is introduced into the reactor and about 77 parts of $O_2$ is absorbed. About 8% of the cyclohexane reacts and the liquid reaction mixture is withdrawn.

The reaction mixture is passed into a hydrolyzer and water is added thereto. The mixture is hydrolyzed, and passed to a filter wherein solid orthoboric acid (with water and organics) is separated.

The oil or filtrate is passed to a still wherein crude cyclohexanol containing about 9% cyclohexanone is separated as a bottoms fraction. The hydrocarbon vapor is condensed, water is separated and removed, and liquid hydrocarbon is recycled.

The solid (or slurry with added hydrocarbon) is passed into a dehydrator wherein water is varopized therefrom. The temperature is maintained at about 150° C. The resulting slurry of meta-boric acid in hydrocarbon is passed back to the reactor.

Instead of a filter, other solid separation means may be used. A lower hydrate of ortho-boric acid is maintained in admixture with the reactants during the oxidation reaction. Preferred lower hydrates are meta-boric acid, tetra-boric acid, boron oxide, or mixtures thereof.

Suitable oxidation and also dehydration temperatures are broadly 75° to 300° C., desirably 100° to 160° and preferably 140° to 155° C.

The crude cyclohexanol mixture contains up to 15% (mol) of cyclohexanone and the mixture is mixed with ammonia and passed over a nickel or alumina (or kieselguhr)hydrogenation catalyst in the presence of hydrogen at about 200° C. and 200 p.s.i.g. whereby cyclohexylamine is formed. About 2 mols of ammonia (or more up to about 10 mols) are used per mol of cyclohexanol. About 2 (up to 10) mols of hydrogen are used per mol of cyclohexanol; e.g., at least a slight excess over the stoichiometric requirements for reducing the cyclohexanone present to cyclohexanol, such as an excess of 5% (mol) up to about 25% or more.

The cyclohexylamine is separated from the reaction mixture e.g. by distillation, and the small amount of residue which may include crude cyclohexanone derived Schiff base and/or residual oxygenated cyclohexane material is recycled to the amination step. In this way intermediate refining steps are avoided or minimized, and maximum output is achieved of the desired amine, e.g.

a 5 to 30% improvement in yield due to this recycling.

The amine is reacted with hydrogen peroxide, 2 mols (or up to 4 mols) per mol of amine, at a temperature in the range of about 0° to 20° C. in the presence of 200% (wt.) water and 4% (wt.) based on amine of sodium tungstate, whereby a cyclohexanone oxime is prepared. Other tungstate or the like catalysts such as cyclohexylamine tungstate may be used. The oxime is separated in usual manner by distillation of the initial amine-oxime crystals, and the small portion of organic distillation residue is recycled to the amination step. In this combined operation, by-product disposal requirements or losses are avoided, and maximum output of the desired oxime is achieved; e.g. a 3 to 10% improvement in yield due to this recycling.

The oxime is reacted with concentrated sulfuric acid which is intended to include oleum whereby epsilon-caprolactam is formed, and this is separated and refined, each step being carried out in known manner. The lactam may be converted to nylon-6, a commercially important material, in known manner. For the manufacture of nylon-6 polymer, see pages 30 and 31 in "Man-Made Textile Encyclopedia," J. J. Press, Textile Book Publishers, Inc. (Division of Interscience Publishers, Inc.) New York, 1959.

The initial cyclohexane oxidation is at a temperature in the range of 75° to 300° C. and a pressure in the range of 100 to 1000 p.s.i.g.

If desired, the initial oxygenated cyclohexane material may be washed with dilute aqueous caustic or equivalent material to separate adipic acid therefrom prior to the amination step. The treatment of cyclohexylamine with hydrogen peroxide may be carried out in the presence of a chelating agent such as 2,6-dipicolinic acid, whereby the reaction may be conducted at a higher temperature of the order of 25° to 75° C. with rapid reaction and good yields.

The appropriate amination reaction temperature is broadly between 130° and 500° C., and most desirably 150° and 250° C. The total pressure in the amination step can range from 5 to as high as 250 atmospheres.

By "a crude cyclohexanol" is meant crude cyclohexanol and those substituted derivatives of cyclohexanol in which one or more ring hydrogens is replaced by an aliphatic or aromatic hydrocarbon group, or both. These compounds include methylcyclohexanol and dimethylcyclohexanol.

Preferably, a metal of Group VIII of the periodic table such as metals of the platinum group, platinum, palladium, rhodium, ruthenium and iridium, as well as cobalt and nickel, copper, molybdenum, chromium or mixtures thereof, is used in the amination step, as the hydrogenation catalyst. Although best yields are obtained using a catalyst supported on neutral materials, such as on carbon, silica, silicon carbide or alpha-alumina of the porous type, good yields can be obtained by using those catalysts supported on neutralized acidic supports such as silica-aluminas. Self-supporting catalyst such as the "foraminates" may be employed. These catalysts are described in detail in Groggins, Unit Processes in Organic Synthesis, McGraw-Hill Book Co., Inc. (New York), 1958, vol. 5. pages 434–438.

In another embodiment of the invention, it has been found that particularly high amination yields can be obtained by controlling the acidity of the catalyst. Highly acidic catalysts result in less attractive yields, Preferably, the pH of the catalyst should be greater than 5. A pH range of 5 to 10 is most desirable. The acidity of the catalyst may be reduced by any convenient procedure, e.g. soaking in 0.1 N NaOH.

In view of the forgeoing disclosures, variations and modifications thereof will be apparent to one skilled in the art, and it is intended to include within the invention all such variations and modifications except as do not come within the scope of the appended claims.

What is claimed is:

1. A process for the preparation of a cyclohexylamine from a cyclohexanol mixture containing up to about 15% of the corresponding cyclohexanone, comprising reacting the mixture with ammonia in the presence of hydrogen and a hydrogenation catalyst at elevated temperature in the range of 130° to 500° C. and pressure in the range of 5 to 250 atmospheres to form said cyclohexylamine, at least part of said cyclohexylamine being derived from the cyclohexanone, recovering the latter, the ratio of ammonia being in the range of 2 to 10 mols per mol of the crude cyclohexanol and the ratio of hydrogen being in the range of 2 to 10 mols per mol of said cyclohexanol.

2. A process of claim 1 wherein the cyclohexylamine is recovered by distillation of the ammonia reaction product and the resulting residue is recycled to the ammonia reaction step.

3. A process of claim 2 wherein the hydrogenation catalyst is nickel-on-alumina and the ammonia reaction step is carried out at 200° C. and 200 p.s.i.g.

References Cited
UNITED STATES PATENTS

| | | | |
|---|---|---|---|
| 2,636,902 | 4/1953 | Taylor et al. | 260—563 X |
| 3,022,349 | 2/1962 | Lemon et al. | 260—585 |
| 3,239,552 | 3/1966 | Feder et al. | 260—462 |
| 3,239,562 | 3/1966 | Barker | 260—563 |
| 3,243,449 | 3/1966 | Winnick | 260—462 |

CHARLES B. PARKER, *Primary Examiner.*

N. WICZER, *Assistant Examiner.*